United States Patent
Yun et al.

(10) Patent No.: US 6,780,541 B2
(45) Date of Patent: Aug. 24, 2004

(54) CARBON ELECTRODE COATED WITH POROUS METAL FILM, ITS FABRICATION METHOD AND LITHIUM SECONDARY BATTERY USING THE SAME

(75) Inventors: Kyung-Suk Yun, Seoul (KR); Byung-Won Cho, Seoul (KR); Won-Il Cho, Seoul (KR); Hyung-Sun Kim, Seoul (KR); Un-Seok Kim, Seoul (KR); Sang-Cheol Nam, Seoul (KR); Young-Soo Yoon, Kyoungki-Do (KR)

(73) Assignee: Korea Institute of Science and Technology, Seoul (KR)

( * ) Notice: Subject to any disclaimer, the term of this patent is extended or adjusted under 35 U.S.C. 154(b) by 167 days.

(21) Appl. No.: 09/932,940

(22) Filed: Aug. 21, 2001

(65) Prior Publication Data

US 2003/0039890 A1 Feb. 27, 2003

(51) Int. Cl.[7] .............................. H01M 4/58; B05D 5/12
(52) U.S. Cl. .................... 429/231.8; 427/113; 427/124; 427/243; 428/457
(58) Field of Search ....................... 429/231.8; 427/113, 427/124, 243, 245; 428/457

(56) References Cited

U.S. PATENT DOCUMENTS

| | | | | |
|---|---|---|---|---|
| 3,850,668 | A | * | 11/1974 | Heffer ..................... 427/245 X |
| 4,571,286 | A | * | 2/1986 | Penato ..................... 427/113 X |
| 4,851,285 | A | * | 7/1989 | Brotz ..................... 427/243 X |
| 5,300,165 | A | * | 4/1994 | Sugikawa ................. 427/124 X |
| 5,879,791 | A | * | 3/1999 | Kato et al. .............. 428/457 X |
| 6,068,931 | A | * | 5/2000 | Adam et al. ............. 428/457 X |
| 6,391,497 | B1 | * | 5/2002 | Yoon et al. .............. 429/231.8 |

OTHER PUBLICATIONS

K. Zaguib et al., "Chemical Passivation of Lithiated Carbon Fibers", The 8th Int'l. Meeting on Lithium Batteries, pp. 192–193, 1996., month unknown.
X. Y. Song et al., "Microstructural Characterization of Lithiated Graphite", Journal of Electrochem. Soc., vol. 143, No. 6, Jun. 1996.
A. Wakata et al., "Improvement of Lithium dope/undope characteristics of Graophite treated with Sn chloride", Proceeding of the 38th Japanese Symposium on Batteries, pp. 192–193, 1996., month unknown.

* cited by examiner

Primary Examiner—Stephen J. Kalafut
(74) Attorney, Agent, or Firm—Morrison & Foerster LLP

(57) ABSTRACT

A method for fabricating carbon electrode coated with a porous metal film includes the steps of: positioning a roll of carbon material within a vacuum chamber; winding the carbon material off the roll at a certain speed, winding the carbon material on a different roll while coating a porous metal to a thickness of a few Å~a few μm on the carbon material between the two rolls from a metal evaporation source; and stabilizing the thusly coated carbon material under a vacuum. The coated porous metal film is of Li, Al, Sn, Bi, Si, Sb, Ni, Cu, Ti, V, Cr, Mn, Fe, Co, Zn, Mo, W, Ag, Au, Pt, Ru, Ir, In or their alloys. Since the stable film is formed on the surface of the carbon material, when the thusly coated carbon material is use for forming a cathode electrode of a secondary battery, the reversibility and high rate charging and discharging characteristics of the carbon electrode can be improved. In addition, when a lithium-ion secondary battery is fabricated using the carbon electrode coated with lithium or a lithium alloy, the capacity degradation due to the irreversible capacity of the conventional carbon electrode appearing at the initial state of charging can be prevented, so that the capacity can be increased.

10 Claims, 3 Drawing Sheets

CARBON ELECTRODE COATED WITH POROUS METAL FILM, ITS FABRICATION METHOD AND LITHIUM SECONDARY BATTERY USING THE SAME

BACKGROUND OF THE INVENTION

1. Field of the Invention

The present invention relates to carbon electrodes coated with a porous metal film and to its fabrication method and a lithium ion secondary battery using the same.

2. Description of the Background Art

A conventional lithium-ion secondary battery uses a compound which includes lithium, such as $LiCoO_2$ or $LiMn_2O_4$, as a cathode. Thus, such a battery is fabricated without having lithium in a carbon electrode used as an anode.

In case of the use of a carbon electrode in a lithium ion secondary battery, in the initial charging of the battery, a passive film is formed on the surface of the carbon electrode. The passive film improves a stabilization of the carbon structure and the reversibility of the carbon electrode, making it possible to use the carbon electrode as an anode of lithium-ion secondary battery.

However, such formation of a passive film is an irreversible reaction, bringing about a contrary effect that it causes the consumption of lithium ions and thereby a reduction in the capacity of the battery, as well as degradation of the life cycle of the battery.

In order to compensate for this loss of lithium ions which occurs during the initial charging of the battery, it is known to provide the battery with an excess amount of lithium ions, by a so-called "cathode loading" in which the carbon electrode is pre-lithiated by intercalating lithium therein.

Conventionally, there are two known methods for pre-lithiating the carbon electrode; one is a method for prelithiating a carbon active material by a physicochemical process and fabricating an electrode (K. Zaguib, R. Yazami and M. Broussely, $8^{th}$ International Meeting on Lithium Batteries, 192(1996)), and the other is a method for prelithiating a carbon electrode electrochemically (X. Y. Song and K. Kinoshita, J. Electrochem. Soc., 143, L120(1996), I. I. Olsen and R. Koksbang, U.S. Pat. No. 5,595,837 (1997)).

Since the physicochemical prelithiation process needs to be performed at a high temperature, there is a risk of a fire or an explosion.

Comparatively, the electrochemical prelithiation process can be performed at room temperature, but there is a difficulty in its processing. Especially, this method is disadvantageous in that, since the lithium reaction rate is adjusted by adjusting a current by using a power supply, a power source must be installed and controlled. In addition, since there is no stabilizing process, lithium is not evenly dispersed in the carbon electrode, resulting in a problem that the battery characteristics, especially, a life cycle characteristic, are deteriorated.

Meanwhile, as for the carbon electrode, since the carbon lattice constant is much changed during charging and discharging, the carbon active material is gradually released from an electronic conduction path with repeated charging and discharging, causing problems of reduction of electrode capacity, degradation of a high rate charging and discharging characteristic or degradation of the life cycle.

In an effort to offset the reduction in the conductivity of the carbon active material, generally, carbon having a favorable conductivity such as acetylene black (AB) is added as a conductive material to fabricate an electrode, which is, however, yet to be much improved in the aspect of battery performance.

As an improvement, there have been proposed a method in which a metal having a good conductivity such as silver is added after being reduced (Korea Technochemistry Association, General Meeting, Spring, Excerpt of a Thesis, pp.154~156, May 9~10, 1998), or a method in which, in order to improve the electrode capacity, tin oxide or the like is precipitated in carbon and more than two types of cathode active materials are used together ($38^{th}$ Open Discussion for Battery, pp.207~208, Osaka, Japan, November 11~13, 1997).

However, those methods are performed in an aqueous solution, which requires washing and drying processes. In addition, a costly reagent must be used, its processes are difficult, a high fabrication cost is incurred, and the adherence of the coated film is not good.

SUMMARY OF THE INVENTION

Therefore, an object of the present invention is to provide carbon electrode coated with a porous metal film and its fabrication method and a lithium-ion secondary battery using the same, that are capable of preventing capacity degradation of the carbon electrode caused due to an irreversible reaction generated at the initial state of charging, capable of improving a life cycle by compensating for the amount of lithium consumed due to a low efficiency in charging and discharging, and capable of simplifying the fabrication process of a secondary battery to reduce its fabrication cost.

To achieve at least the above objects in whole or in parts, there is provided carbon electrode for a lithium-ion secondary battery, coated with a porous metal film having a thickness of a few Å~a few $\mu$m.

To achieve at least these advantages in whole or in parts, there is further provided a method for fabricating carbon electrode coated with a porous metal film including the steps of: positioning a carbon electrode roll within a vacuum chamber; winding the carbon electrodes off the roll at a certain speed, winding the carbon electrodes on a different roll and coating a porous metal with a thickness of a few Å~a few $\mu$m on the carbon electrode between the two rolls from a metal evaporation source; and stabilizing the carbon electrode in a vacuum state for a predetermined time period at a predetermined temperature.

To achieve at least these advantages in whole or in parts, there is further provided a lithium-ion secondary battery having carbon electrode coated with a porous metal thin film with a thickness of a few Å~a few $\mu$m and an cathode comprising $LiCoO_2$, $LiMn_2O_4$, $LiNiO_2$, $V_6O_{13}$ or $V_2O_5$.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1A:
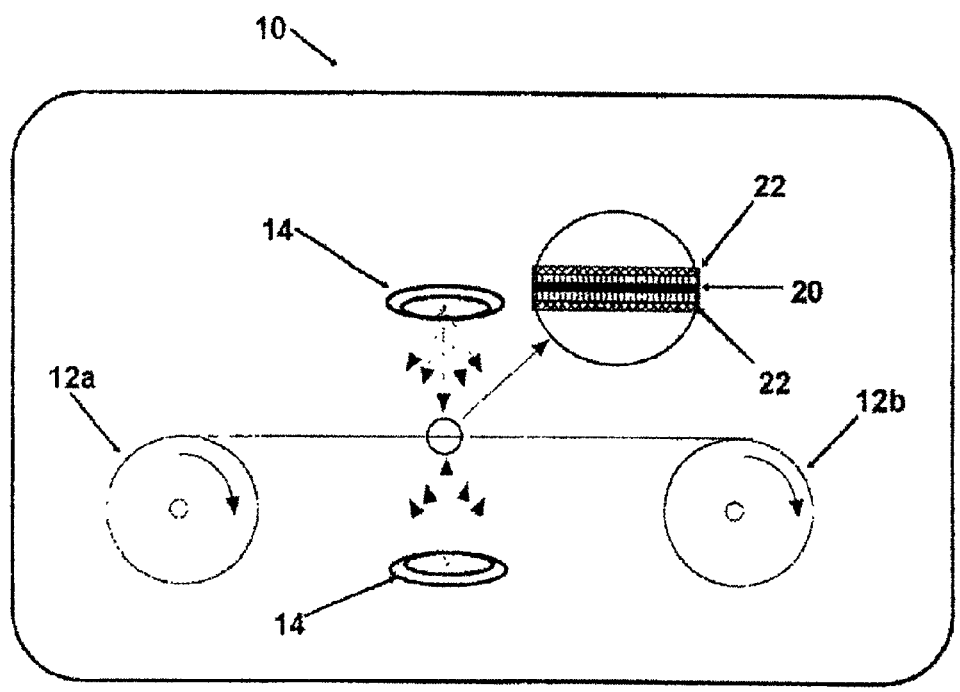
FIGS. 1A and 1B are schematic views showing a method for processing the surface of carbon electrodes in accordance with a preferred embodiment of the present invention.
Figure 1B:
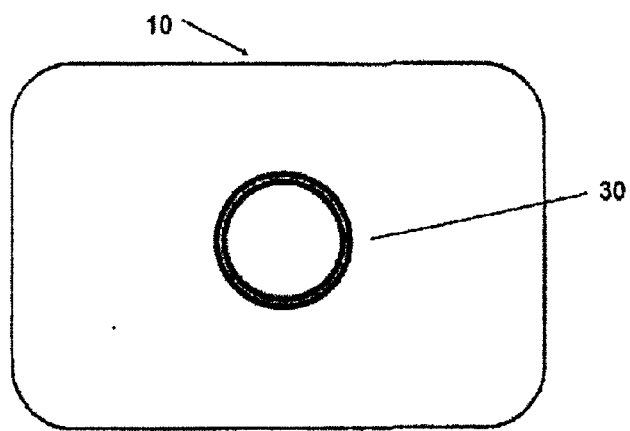

FIGS. 1A and 1B are schematic views showing a method for processing the surface of carbon electrodes in accordance with a preferred embodiment of the present invention.

In order to coat a porous metal film on the surface of carbon electrodes 20, a roll 12a (supply roll) of carbon electrode material 20 for forming carbon electrode for a lithium-ion battery is positioned in a vacuum chamber 10 and the chamber 10 is put under a vacuum. Then a porous metal film 22 is deposited on both surfaces of the carbon electrode material 20 from metal evaporation sources 14 by using a heating deposition process, an electron beam deposition process, an ion line deposition process, a sputtering deposition process or a laser ablation process.

At this time, the roll 12a of carbon electrode material 20 is gradually wound off to be wound onto another roll 12b (takeup roll), so that an even thickness of porous metal film can be coated on the surfaces thereof. In this respect, by controlling the winding rate and the deposition rate of the metal, a few Å~a few $\mu$m thickness of porous metal 22 thin film can be deposited on the surfaces of the carbon electrode material 20.

That is, by this method, the coating rate and the coating amount of the porous metal film can be controlled. In addition, different types of porous metals and different evaporation rates may be selected to be deposited to obtain different types and alloys of porous metals and alloy compositions.

After the porous metal thin film 22 is coated, it is stabilized for a predetermined time in a vacuum state at a predetermined temperature, so that a stable porous metal film is formed on the surfaces of the carbon electrode material 20 to improve a reversibility of the carbon electrode and the high rate charging and discharging characteristics are improved by heightening the conductivity.

FIG. 1B shows a stabilization of the roll of carbon electrode material 30 coated with the porous metal thin film.

The coated porous metal film may be of Li, Al, Sn, Bi, Si, Sb, Ni, Cu, Ti, V, Cr, Mn, Fe, Co, Zn, Mo, W, Ag, Au, Pt, Ru, Ir, In or their alloys.

Especially, in case of coating lithium and a lithium alloy, since lithium is evenly dispersed and intercalated in the carbon electrodes thanks to a stabilizing process, the characteristic of the electrodes is improved.

When a lithium-ion secondary battery is fabricated with the carbon electrode coated with a lithium-ion or a lithium alloy, the capacity degradation due to the irreversible capacity loss in the carbon electrode which occurs at the initial state of charging is prevented, resulting in an increase in the capacity. In addition, the amount of lithium which is consumed due to the low efficiency in charging and discharging is compensated for, so that the life cycle can be improved.

The present invention has advantages that a desired single metal or an alloy may be coated freely, a pure porous metal can be coated without external contamination, the deposition rate can be controlled freely to control the evenness of the film and deposition time, and all the processes may be performed in an automatic system.

When the porous metal film is coated on the surfaces of the carbon electrode, its electrical conductivity is improved, so that a current and a dislocation distribution degree can be constant, and thus, a local overcharging reaction is restrained. Accordingly, the use rate of the electrodes and the life cycle can be increased. In addition, thanks to the porous film, the lithium-ion movement speed is not degraded, and when the coated electrode is adopted to a large-scale battery, its effect is highly increased.

The stabilization time is different depending on the type of the coated porous metal. Generally, It should be suitably maintained in a vacuum atmosphere lower than $10^{-1}$ torr at a temperature of 20° C.~100° C. for 1 hour to 24 hours.

The carbon electrode material to be used are fabricated with an active material such as graphite, coke, hard carbon likewise to conventional materials used in the lithium-ion battery, and the cathode is fabricated from an active material such as $LiCoO_2$, $LiMn_2O_4$, $LiNiO_2$, $V_6O_{13}$ or $V_2O_5$, as used conventionally to fabricate a lithium-ion secondary battery.

The coated carbon electrode of the preferred embodiment of the present invention has an advantage that it can be used as a cathode of a lithium-ion battery using a separating film such as a PP or a PE, as a cathode of a lithium polymer battery using a polymer electrolyte, or as a cathode of an entire solid type lithium-ion secondary battery using a solid electrolyte.

Next examples and comparative examples of the fabrication of carbon electrode coated with the porous metal and of lithium-ion secondary batteries made therefrom and of tests of their performance will be described, to aid in an understanding of the invention.

EXAMPLE 1

In case of fabricating a carbon anode, a composition of 6 g of graphite, 0.3 g of AB and 0.4 g of polyvinylidenefluoride (termed as 'PVdF', hereinafter) were mixed in a suitable amount of NMP (N-methyl1-2-pyrrolidinone) and acetone. When an adequate viscosity was obtained, the resulting solution was cast on a copper thin plate, dried and rolled to obtain the electrode material.

Using the technique shown in FIG. 1A, lithium metal was coated to a thickness of about 2000 Å on both surfaces of the electrode material by a heating deposition process, and stabilized under a vacuum state at room temperature for 12 hours, to thereby obtain material for carbon electrode coated with porous metal.

In case of fabricating a $LiCoO_2$ cathode, a composition of 5.7 g of $LiCoO_2$, 0.6 g of AB and 0.4 g of PVdF was mixed with a suitable amount of NMP and acetone. When an adequate viscosity was obtained, the resulting solution was cast on an aluminum thin plate, dried and rolled to obtain material for an electrode.

A lithium-ion secondary battery was fabricated such that a carbon anode coated with lithium metal, a PP (polypropylene) separating film and the $LiCoO_2$ cathode were stacked, to which an ethylene carbonate-diethyl carbonate (termed as 'EC-DEC', hereinafter) solution in which 1M $LiPF_6$ had been dissolved was injected. And then, the electrode capacity and life cycle of the cathode were checked at the discharge rate of C/3.

Comparative Example 1

In the case of fabricating a carbon anode, a composition of 6 g of Gr, 0.3 g of AB and 0.4 g of PVdF was mixed in a suitable amount of NMP and acetone. When an adequate viscosity was obtained, the resulting solution was cast on a copper thin plate, dried and rolled to obtain the electrode material.

In the case of fabricating a $LiCoO_2$ cathode, a composition of 5.7 g of $LiCoO_2$, 0.6 g of AB and 0.4 g of PVdF was mixed with a suitable amount of NMP and acetone. When an adequate viscosity was obtained, the resulting solution was cast on an aluminum thin plate, dried and rolled to obtain material for an electrode.

A lithium-ion secondary battery was constructed such that the carbon anode, a PP separating film and the $LiCoO_2$ cathode were stacked, to which EC-DEC solution in which 1M $LiPF_6$ has been dissolved is injected. And then, the electrode capacity and life cycle of the cathode were checked at the discharge rate of C/3.

EXAMPLE 2

In the case of fabricating a carbon anode, a composition of 6 g of Gr, 0.3 g of AB and 0.4 g of PVdF was mixed in a suitable amount of NMP and acetone. When an adequate viscosity was obtained, the resulting solution was cast on a copper thin plate, dried and rolled to obtain the electrode material.

Using the technique shown in FIG. 1A, aluminum metal was coated to a thickness of about 2000 Å on both surfaces of the electrode material by a heating deposition process, and stabilized under a vacuum state at room temperature for 12 hours, to thereby obtain material for a carbon electrode coated with a porous metal.

In the case of a $LiCoO_2$ cathode, a composition of 5.7 g of $LiCoO_2$, 0.6 g of AB and 0.4 g of PVdF was mixed with a suitable amount of NMP and acetone. When an adequate viscosity was obtained, the resulting solution was cast on an aluminum thin plate, dried and rolled to obtain the electrode material for cathode.

A lithium-ion secondary battery was fabricated such that a carbon anode coated with aluminum metal, a PP separating film and a $LiCoO_2$ cathode were stacked, to which an EC-DEC solution in which 1M $LiPF_6$ had been dissolved was injected. Then, the electrode capacity and life cycle of the cathode were checked at the discharge rate of C/3.

EXAMPLE 3

In the case of fabricating a carbon anode, a composition of 6 g of Gr, 0.3 g of AB and 0.4 g of PVdF was mixed in a suitable amount of NMP and acetone. When an adequate viscosity was obtained, the resulting solution was cast on a copper thin plate, dried and rolled to obtain an electrode.

Using the technique shown in FIG. 1A, lithium metal was coated to a thickness of about 2000 Å on both surfaces of the electrode by a heating deposition method, and then stabilized under a vacuum state at room temperature for 12 hours, to thereby obtain carbon electrode material coated with a porous metal film.

In the case of fabricating a $LiCoO_2$ cathode, a composition of 5.7 g of $LiCoO_2$, 0.6 g of AB and 0.4 g of PVdF was mixed with a suitable amount of NMP and acetone. When an adequate viscosity was obtained, the resulting solution was cast on an aluminum thin plate, dried and rolled to obtain material for an electrode.

A lithium-ion secondary battery was fabricated such that a carbon anode coated with a lithium-aluminum alloy, a PP separating film and the $LiCoO_2$ cathode were stacked, to which EC-DEC solution in which 1M $LiPF_6$ had been dissolved was injected. Then, the electrode capacity and life cycle of the cathode were checked at the discharge rate of C/3.

Figure 2:
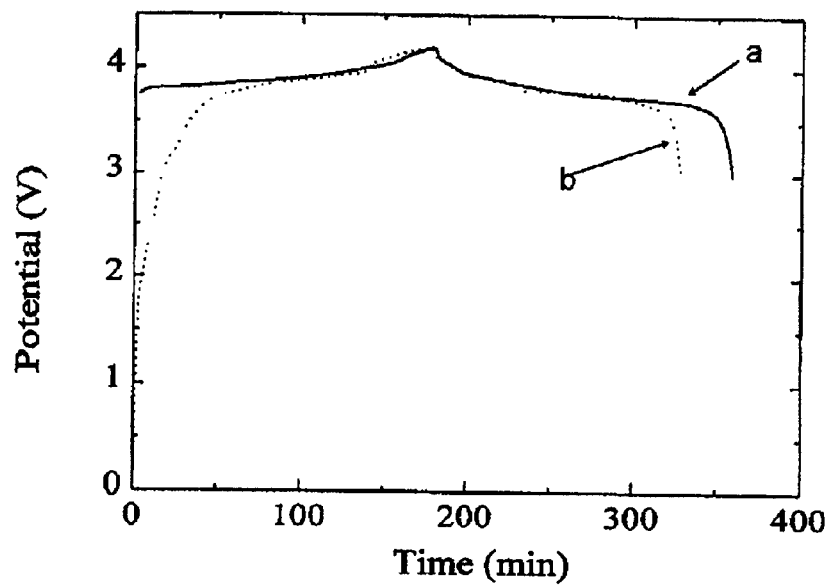
FIG. 2 is a graph showing the charging and discharging characteristics of a lithium-ion secondary battery fabricated with the carbon electrode of Example 1 in accordance with the preferred embodiment of the present invention and of Comparative Example 1.

FIG. 2 shows the results of the tests of the charging and discharging characteristics of the lithium-ion secondary battery of Example 1 and of Comparative Example 1 fabricated adopting the above described methods.

As shown in FIG. 2, the battery fabricated according to Example 1 did not exhibit an irreversible reaction at the initial charging state and its charging and discharging efficiency was almost 100%. Its electrode capacity was excellant (a). In comparison, the battery fabricated according to Comparative Example 1, the existing method, exhibited an irreversible reaction, lowering the charging and discharging efficiency and the electrode capacity (b).

Figure 3:
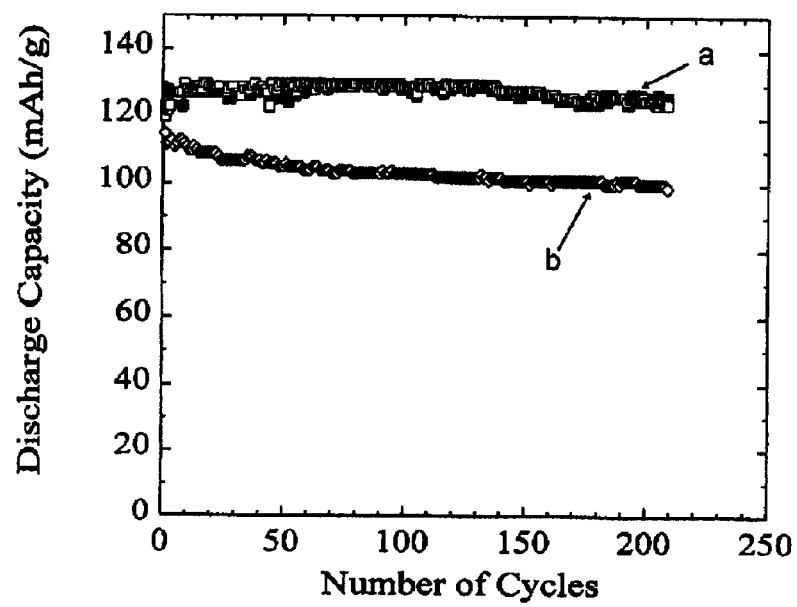
FIG. 3 is a graph showing the electrode capacity and life testing results of the lithium-ion secondary battery fabricated with carbon electrode in accordance with the preferred embodiment of the present invention and that of Comparative Example 1.

FIG. 3 is a graph showing the electrode capacity of the $LiCoO_2$ active material and life cycle characteristics of the lithium-ion secondary batteries fabricated by adopting the above-described methods of Example 1 according to the present invention and of Comparative Example 1.

As shown in FIG. 3, the batteries fabricated according to the method of the preferred embodiment of the present invention (Examples 1, 2 and 3) exhibited excellent electrode capacity and life cycle characteristics (a). In comparison, however, the battery fabricated according to the method of Comparative Example 1 had somewhat degraded electrode capacity and life cycle characteristics (b).

Figure 4:
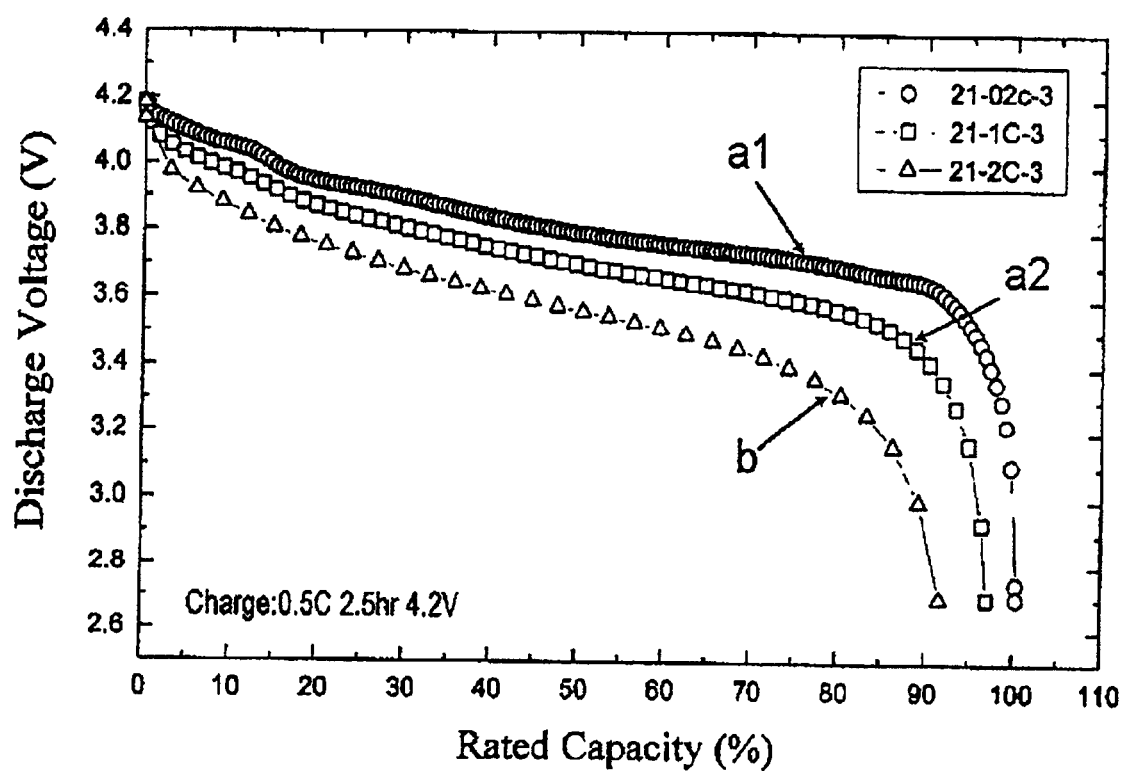
FIG. 4 is a graph showing the high rate discharging characteristics of the lithium-ion secondary battery fabricated by the method of Example 1 and Comparative Example 1.

FIG. 4 is a graph showing the high rate discharging characteristics of the lithium-ion secondary batteries fabricated in Example 1 (a1), Example 2 (a2) and Comparative Example 1 (1b).

As shown in FIG. 4, the lithium-ion secondary battery fabricated by adopting the method of the present invention exhibits excellent high rate discharging characteristics.

As so far described, the carbon electrode coated with porous metal film, its fabrication method and a lithium-ion secondary battery using the same provide significant advantages.

For example, first, since the stable film is formed on the surfaces of the carbon electrodes, the reversibility and high rate charging and discharging characteristics of the carbon electrodes can be improved.

Secondly, when a lithium-ion secondary battery is fabricated using the carbon electrode coated with lithium or a lithium alloy, the capacity degradation due to the irreversible capacity of the carbon electrode appearing at the initial state of charging can be prevented, so that the capacity can be increased.

Thirdly, since the amount of the lithium consumed due to the bad efficiency of charging and discharging is compensated, the carbon electrode and lithium-ion secondary battery with highly improved life cycle can be provided as well as its method.

Accordingly, the carbon electrode coated with a porous metal film and its fabrication method and a lithium-ion secondary battery using the same are advantageously applicable to various industrial sectors such as various compactsize electronic appliances, communication appliances, or the power source of an electric automobile.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An electrode of a secondary battery comprising a porous film on a carbon electrode, wherein the porous film consists essentially of a metal or a metal alloy and the carbon electrode is a sheet of a composite material comprising a carbon component.

2. A method for fabricating an electrode comprising:
   positioning a sheet of carbon material within a vacuum chamber;
   coating a porous metal film on a surface of the sheet of carbon material; and
   stabilizing the porous metal film under a vacuum of below $10^{-1}$ torr at a temperature of 20° C.~100° C. for 1~24 hours.

3. The method of claim 2, wherein the porous metal film is coated by a process selected from the group consisting of a heating deposition process, an electron beam deposition process, an ion line deposition process, a sputtering deposition process, a laser ablation process, and a combination thereof.

4. The method of claim 2, wherein the porous metal film comprises a metal or a metal alloy selected from the group consisting of lithium, aluminum, tin, bismuth, antimony, copper, titanium, vanadium, chrome, manganese, iron, cobalt, zinc, molybdenum, tungsten, silver, gold, platinum, ruthenium, iridium, indium and a combination thereof.

5. The method of claim 2, wherein the carbon material comprises an active material selected from the group consisting of graphite, coke, hard carbon and a combination thereof.

6. A lithium-ion secondary battery comprising an electrode of the secondary battery comprising a porous film on a carbon electrode, wherein the porous film consists essentially of a metal or a metal alloy, and an cathode comprising a cathode material selected from the group consisting of $LiCoO_2$, $LiMn_2O_4$, $LiNiO_2$, $V_6O_{13}$ and $V_2O_5$.

7. The lithium-ion secondary battery of claim 6, wherein the porous metal film comprises a metal or a metal alloy selected from the group consisting of lithium, aluminum, tin, bismuth, antimony, copper, titanium, vanadium, chrome, manganese, iron, cobalt, zinc, molybdenum, tungsten, silver, gold, platinum, ruthenium, iridium, indium and a combination thereof.

8. A lithium-ion secondary battery comprising an electrode of the secondary battery comprising a porous film on a carbon electrode, wherein the porous film consists essentially of a metal or a metal alloy.

9. An electrode of a secondary battery comprising a porous film on a sheet of a composite material comprising a carbon component, wherein the porous film comprises a metal or a metal alloy.

10. A lithium-ion secondary battery comprising an electrode of the secondary battery comprising a porous film on a carbon electrode, wherein the porous film comprises a metal or a metal alloy.

* * * * *